(12) United States Patent
Brucato et al.

(10) Patent No.: US 12,436,949 B2
(45) Date of Patent: Oct. 7, 2025

(54) USING WORKLOAD REDUCTION TO IMPROVE INDEX TUNING

(71) Applicant: Microsoft Technology Licensing, LLC, Redmond, WA (US)

(72) Inventors: Matteo Brucato, Mountlake Terrace, WA (US); Tarique Ashraf Siddiqui, Redmond, WA (US); Wentao Wu, Kirkland, WA (US); Vivek Ravindranath Narasayya, Redmond, WA (US); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/426,041

(22) Filed: Jan. 29, 2024

(65) Prior Publication Data
US 2025/0245222 A1 Jul. 31, 2025

Related U.S. Application Data

(60) Provisional application No. 63/625,116, filed on Jan. 25, 2024.

(51) Int. Cl.
*G06F 16/2453* (2019.01)
*G06F 16/22* (2019.01)
(52) U.S. Cl.
CPC .... *G06F 16/24537* (2019.01); *G06F 16/2272* (2019.01)

(58) Field of Classification Search
CPC ...................................................... G06F 16/00
See application file for complete search history.

(56) References Cited

U.S. PATENT DOCUMENTS

| | | | |
|---|---|---|---|
| 6,266,658 B1* | 7/2001 | Adya | G06F 16/22 707/999.005 |
| 6,598,038 B1* | 7/2003 | Guay | G06F 16/2272 |
| 2005/0125427 A1* | 6/2005 | Dageville | G06F 16/217 |
| 2008/0033912 A1* | 2/2008 | Bossman | G06F 16/217 |
| 2015/0379080 A1* | 12/2015 | Jochimski | G06F 16/24534 707/600 |
| 2015/0379404 A1* | 12/2015 | Ezick | G06N 20/00 706/57 |
| 2017/0147644 A1* | 5/2017 | Lee | G06F 16/00 |
| 2018/0300369 A1* | 10/2018 | Svec | G06F 16/24544 |
| 2018/0341677 A1* | 11/2018 | Fan | G06F 16/24542 |
| 2023/0385261 A1* | 11/2023 | Siddiqui | G06F 16/2272 |

* cited by examiner

*Primary Examiner* — William P Bartlett
(74) *Attorney, Agent, or Firm* — Ray Quinney & Nebeker P.C.; Christopher K. Hallstrom

(57) ABSTRACT

This disclosure describes a workload reduction system that reduces the complexity of workloads sent to a database system. For instance, the workload reduction system pre-processes workloads sent to a database system by generating reduced workloads that include less complex queries that reference fewer tables or columns than the original workloads. In various implementations, the workload reduction system uses table reduction functions and query re-writing functions to generate the reduced workloads. As a result, the workload reduction system improves computational efficiency by rewriting complex queries from workloads into simpler ones that speed up index tuning and decrease individual what-if call times.

20 Claims, 9 Drawing Sheets

```
                    Q₁                              Q₂
        SELECT  S_Name,                 SELECT  SUM(L_ExtendedPrice*(1-L_Discount))
                COUNT (*) AS numwait            AS  revenue
          FROM  LineItem, Supplier, Nation  FROM  LineItem, Orders
         WHERE  L_SuppKey = S_SuppKey     WHERE  L_OrderKey = O_OrderKey
           AND  S_NationKey = N_NationKey   AND  O_OrderDate >= '1994-05-01'
           AND  N_Name = 'INDIA'            AND  O_OrderDate < DATEADD(mm,3, '1994-05-01')
      GROUP BY  S_nAME                      AND  L_ReturnFlag = 'R'
```

420

⬇

```
                   Q'₁                             Q'₂
        SELECT  S_Name, S_NationKey,    SELECT  L_OrderKey,
                COUNT (*) AS numwait            SUM(L_ExtendedPrice*(1-L_Discount))
          FROM  LineItem, Supplier              AS  revenue
         WHERE  L_SuppKey = S_SuppKey     FROM  LineItem
      GROUP BY  S_Name, S_NationKey      WHERE  L_ReturnFlag = 'R'
                                      GROUP BY  L_OrderKey
```

USING WORKLOAD REDUCTION TO IMPROVE INDEX TUNING

CROSS-REFERENCE TO RELATED APPLICATIONS

This application claims benefit and priority to Provisional Application No. 63/625,116, filed on Jan. 25, 2024, the entirety of which is incorporated herein by reference.

BACKGROUND

Recent years have seen a significant increase in the use of computing devices to create, store, and process data. This includes the increasing prevalence of tools and applications designed for managing and querying datasets and database systems. As databases grow in size and complexity, the demand for computer time and resources escalates, particularly when it comes to index tuning.

Index tuning is a process that seeks the optimal index configuration for a given workload, which is typically a set of database queries. Index tuning is often resource-intensive as it necessitates numerous costly "what-if" calls to a query optimizer, which estimates the cost of a query based on an index configuration without actually constructing the indexes. For traditional database systems, the operational costs of index tuning are high and become impractical when scaled to handle large workloads or for service providers hosting larger databases (e.g., ranging from thousands to millions). Moreover, index tuning can be a major cause of bottlenecking and disrupt the operation of other services and productions on the same computing device.

BRIEF DESCRIPTION OF THE DRAWINGS

The following detailed description provides specific and detailed implementations accompanied by drawings. Additionally, each of the figures listed below corresponds to one or more implementations discussed in this disclosure.

FIGS. 4A-4B illustrate example diagrams for using a query re-write function to re-write queries in the workload based on removed tables.

DETAILED DESCRIPTION

Figure 1A:
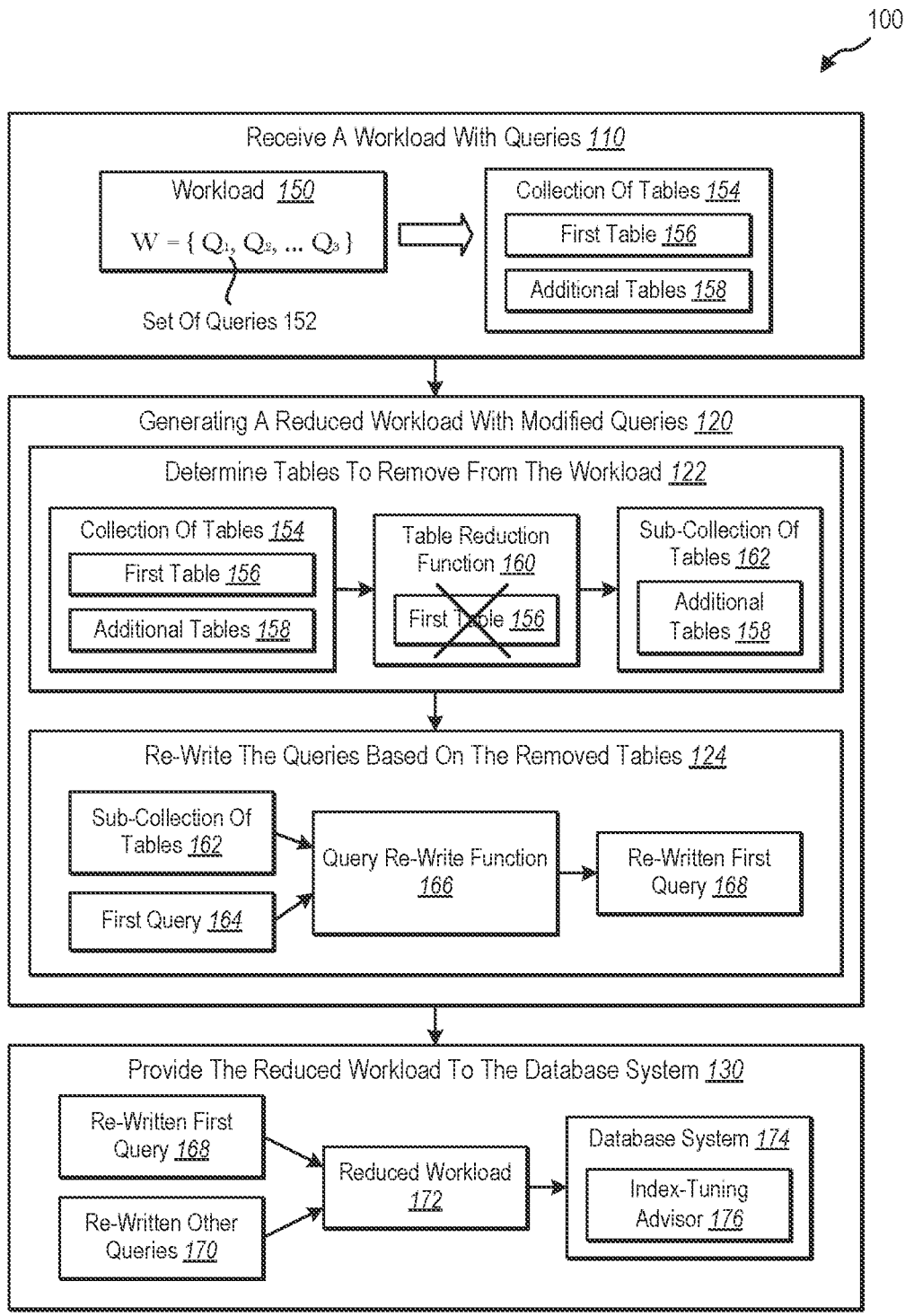
FIGS. 1A-1B illustrate an example overview of the workload reduction system using a table reduction function and a query re-write function to generate reduced workloads.

This disclosure describes a workload reduction system that reduces the complexity of workloads sent to a database system. For instance, the workload reduction system pre-processes workloads sent to a database system by generating reduced workloads that include less complex queries that reference fewer tables or columns than the original workloads. In various implementations, the workload reduction system uses table reduction functions and query re-writing functions to generate the reduced workloads. As a result, the workload reduction system improves computational efficiency by rewriting complex queries from workloads into simpler ones that speed up index tuning and decrease individual what-if call times.

In particular, this disclosure provides benefits and solves problems in the art with systems, computer-readable media, and computer-implemented methods by using a workload reduction system to reduce workload complexity for workloads provided to a database system. As described below, the workload reduction system utilizes table reduction functions and query re-write functions to efficiently generate less complex queries in a workload. Using the reduced workloads, administrative engines on a database system, such as an index-tuning advisor, can process the workload faster by performing fewer database calls and other database operations.

To elaborate, in various implementations, the workload reduction system reduces workload index tuning complexity in a database system by receiving a workload with queries that reference a collection of tables. Upon receiving the workload, the workload reduction system generates a reduced workload by determining a sub-collection of tables that excludes the first table based on scoring each table in the collection of tables and re-writing one or more queries to remove references to excluded tables. In addition, the workload reduction system provides the reduced workload with the re-written queries to an index-tuning advisor of the database system.

As described in this disclosure, the workload reduction system delivers several significant technical benefits in terms of improved efficiency compared to existing systems. Moreover, the workload reduction system provides several practical applications that address problems related to index-tuning advisors becoming bottlenecked when processing large or complex workloads.

To illustrate, the workload reduction system improves computing efficiency by reducing the complexity of queries within a workload. In particular, the workload reduction system determines which tables and/or columns referred to in a workload are of lower value. The workload reduction system then re-writes queries to remove calls to one or more of these lower-value tables. This not only reduces the complexity of queries by reducing the operations in queues, but it also lowers the number of tables and/or columns needed to be accessed to perform a workload.

Some conventional systems attempt to improve computer efficiency by limiting the number of queries and/or operations included in a workload. However, these systems often eliminate necessary queries, causing an index-tuning advisor to spend more computing resources compensating for the inaccurate results of the dropped queries. In contrast to reducing the number of what-if calls, in various implementations, the workload reduction system speeds up index tuning (and other operations) by simplifying what-if calls. Researchers found that the workload reduction system performs index tuning 3 times faster, on average, than state-of-the-art systems, with peak speeds up to 24.7 times faster.

The workload reduction system is especially beneficial when reducing the number of what-if calls is not a viable option. For example, for small but complex workloads, removing or deleting queries is not possible. However, the workload reduction system can still completely reduce the workload while maintaining a high-quality index for these use cases.

By having a reduced workload, the workload reduction system provides a set of modified or re-written queries that have a substantially faster tuning time compared to tuning the original workload. This allows an index-tuning advisor or another database administrator tool to improve the performance of the index-tuning operation. Furthermore, when operating as a pre-processing step to index tuning, the workload reduction system generates a reduced workload without any changes to a database optimizer or index-tuning advisor.

As illustrated in the foregoing discussion, this disclosure utilizes a variety of terms to describe the features and advantages of one or more implementations described. To illustrate, this disclosure describes the workload reduction system in the context of a cloud computing system.

For example, the terms "index," "dataset," and/or "table" may refer to a set of data or a subset of data from a data store or database that includes multiple data entries. For example, as used herein, a dataset may refer to a set of tables, columns within a table, or relations of a database (e.g., a relational database). An index may refer to a listing of keys and corresponding entries from a dataset, table, or database. A "candidate index" may refer to a proposed or hypothetical index that has not yet been built.

A "workload" may refer to a set of queries. In various implementations, the queries are weighted, for example, based on priority, importance, and/or other factors. A "query" may refer to a request or other command(s) that include operators for obtaining data from one or more datasets. In one or more implementations described here, a query refers to a request in a database-aware format indicating how to retrieve selected information from one or more datasets. A query may be in a query language interpretable by an interface of a database system. A query may include operators and conditions (e.g., join conditions) that indicate conditions for accessing or otherwise managing data from one or more datasets.

The terms "candidate index" or "set of candidate indexes" may refer to various indexes from databases corresponding to a workload. In some implementations, candidate indexes include all potential or proposed indexes based on queries in a workload. Additionally, an "index configuration" may refer to a subset of indexes from the candidate index. Thus, in some implementations, the index configuration system can generate various index configurations from a set of candidate indexes (existing or non-existing/proposed) that correspond to a workload.

An "index-tuning advisor" refers to a type of database administrator tool in database management systems that assists in optimizing database performance. An index-tuning advisor analyzes one or more workloads for a database to recommend the optimal index configuration to improve query execution speed. For instance, MICROSOFT® SQL SERVER® provides an Index-Tuning Wizard, which suggests the creation, deletion, or modification of indexes based on the workload. Similarly, Oracle's SQL Tuning Advisor can recommend the creation of SQL profiles and indexes, or modifications to SQL queries to enhance performance. These tools automate the complex and resource-intensive process of index tuning, making it more manageable and efficient.

Additionally, as an example, a "network" refers to one or more data links that enable electronic data transport between computer systems, modules, and/or other electronic devices. A network may include public networks such as the Internet as well as private networks. When information is transferred or provided over a network or another communications connection (whether hardwired, wireless, or a combination), the computer considers the connection as a transmission medium. Transmission media can include a network and/or data links that can be used to carry the necessary program code means in the form of computer-executable instructions or data structures, which can be accessed by a general-purpose or special-purpose computer. Combinations of the above are also included within the scope of computer-readable media.

Figure 1B:
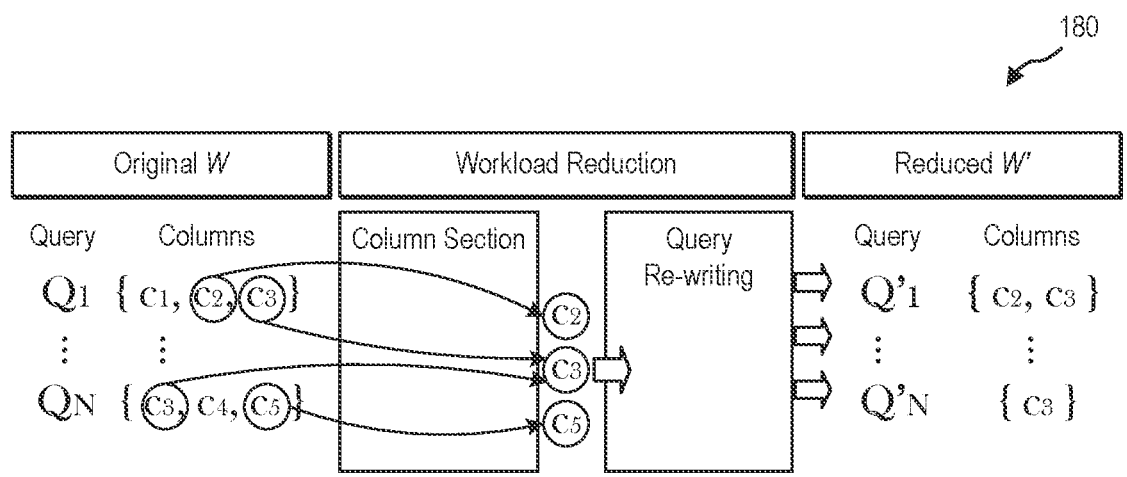

Implementation examples and details of the workload reduction system are discussed in connection with the accompanying figures, which are described next. For example, FIGS. 1A-1B illustrate an example of the workload reduction system using a table reduction function and a query re-write function to generate reduced workloads according to some implementations. In particular, FIG. 1A shows an overview process, and FIG. 1B shows an example of a reduced workload.

As shown, FIG. 1A includes a series of acts 100 performed by or with the workload reduction system. In particular, FIG. 1A includes act 110 of receiving a workload with queries. For example, the workload reduction system receives a workload 150 intended for an index-tuning advisor of a database system. The workload 150 includes a set of queries 152 that reference a collection of tables 154, including a first table 156 and additional tables 158 of the database system. In various implementations, the set of queries 152 references one or more table columns in the database system.

Act 120 includes generating a reduced workload with modified queries. For example, the workload reduction system generates a reduced workload that simplifies the complexity of the set of queries 152 in the workload 150. By reducing the workload, the index-tuning advisor can perform tuning at faster speeds and more efficiently. As shown, act 120 includes two sub-acts as part of generating the reduced workload.

Sub-act 122 includes determining which tables to remove from the workload 150. For example, using the table reduction function 160, the workload reduction system determines to remove the first table 156 from the collection of tables 154 while keeping the additional tables 158. In some instances, the table reduction function 160 determines which tables to remove based on applying a table reduction threshold to table scores. As shown, the workload reduction system uses the table reduction function 160 to generate a sub-collection of tables 162 that excludes the first table 156. Additional details regarding selecting tables, selecting columns, and using the table reduction function are provided below in connection with FIGS. 3A-3B.

Sub-act 124 includes re-writing the queries based on the removed tables. For instance, the workload reduction system uses a query re-write function 166 to re-write queries in the set of queries 152 to remove or modify references to the excluded or removed tables, which reduces the complexity of the queries. As illustrated, the workload reduction system uses the query re-write function 166 to re-write a first query 164 from the set of queries 152 into a re-written first query 168 based on the sub-collection of tables 162 (e.g., references to the first table 156 are removed from the first query 164). Additional details regarding re-writing queries into less complex versions are provided below in connection with FIGS. 4A-4B.

Act 130 includes providing the reduced workload to the database system. For example, the workload reduction system compiles the re-written first query 168 and re-written other queries 170 into a reduced workload 172. The workload reduction system then provides the reduced workload 172 to the index-tuning advisor 176 in the database system 174 (or to another component). Using the reduced workload 172 with the modified set of queries having reduced complexity, the index-tuning advisor 176 performs a faster version of index tuning than performing tuning from the workload 150.

FIG. 1B shows another example diagram 180 of generating a reduced workload from an original workload. While FIG. 1A focuses on tables, FIG. 1B emphasizes column reduction. As shown in FIG. 1B, an original workload ("W") includes a set of queries ("$Q_1$-$Q_N$") that reference columns $c_1$-$c_5$.

The workload reduction system performs workload by first performing column selection (similar to the table reduction function or table selection), which selects $c_2$, $c_3$, and $c_5$ and excludes $c_1$ and $c_4$. The workload reduction system then performs query re-writing to generate a set of modified queries ("$Q'_1$-$Q'_N$") to be included in a reduced workload ("W"). As shown in the reduced workload, the first re-written query $Q'_1$ references columns $c_2$ and $c_3$, whereas the original first query references columns $c_1$, $c_2$, and $c_3$.

Algorithm 1, provided below, provides an example of generating a reduced workload. While Algorithm 1 relates to tables, in some implementations, the references to tables may be replaced with references to columns and column reduction/selection.

---

Algorithm 1 - WRED

Input: Input workload W, max number of tables l ≤ L
Output: Reduced workload W'
1:   W' ← ∅
2:   K ← TABLEREDUCTION(W, l)    (Target set of tables in W')
3:   for all i ∈ [1..N] do
4:      $Q'_i$ ← QUERYREWRITING($Q_i$, K)
5:      W' ← W' ∪ {Q'}
6:   return W'

---

Figure 2:
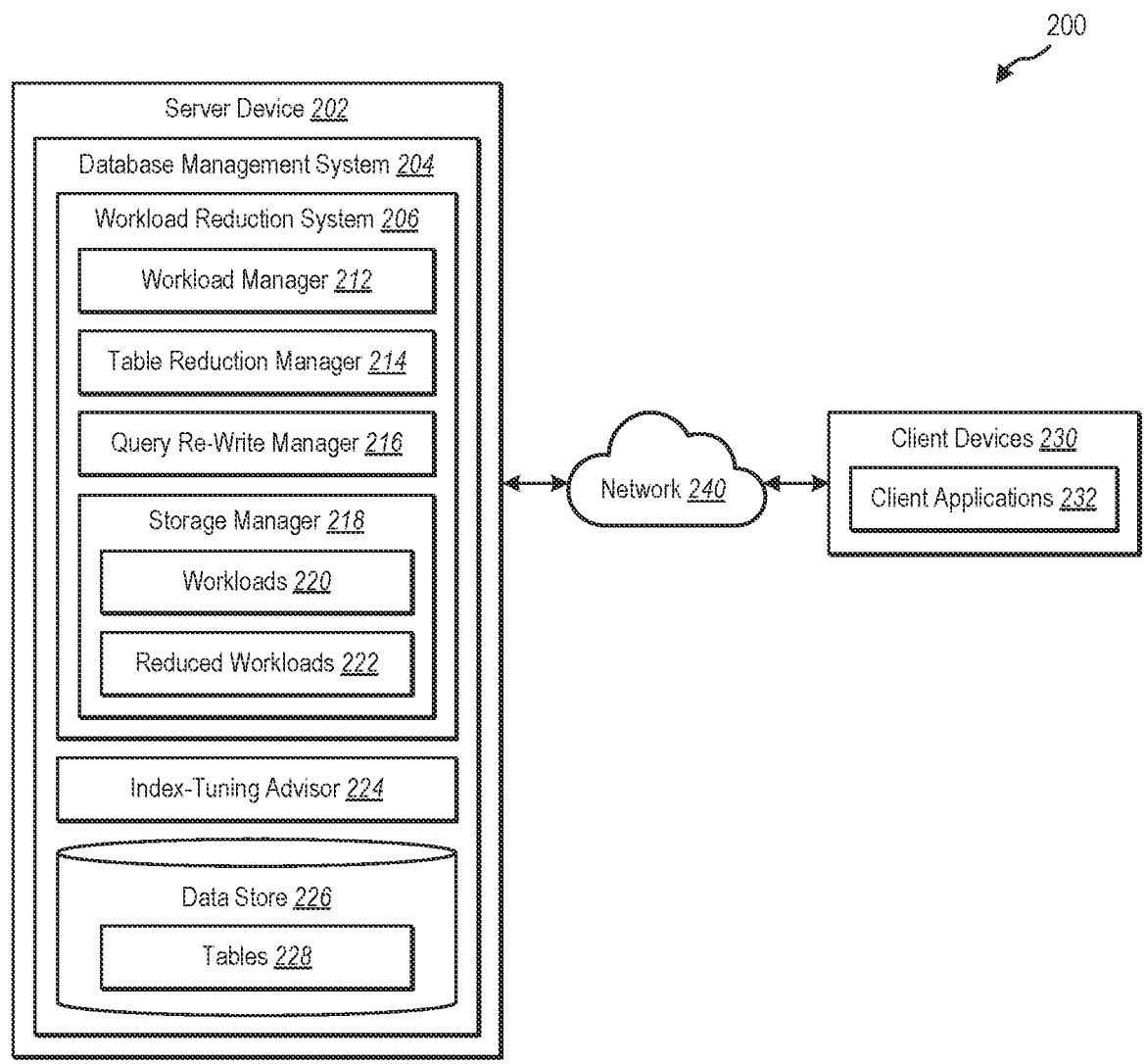
FIG. 2 illustrates an example computing environment where the workload reduction system is implemented.

With a general overview in place, additional details are provided regarding the components, features, and elements of the workload reduction system. To illustrate, FIG. 2 shows an example computing environment where the workload reduction system is implemented according to some implementations. In particular, FIG. 2 illustrates an example of a computing environment 200 with various computing devices associated with a workload reduction system 206. While FIG. 2 shows example arrangements and configurations of the computing environment 200, the workload reduction system 206, and associated components, other arrangements and configurations are possible.

As shown, the computing environment 200 includes a server device 202 (representing one or more server devices) that implements a database management system 204. As also shown, the computing environment 200 also includes a client device 230 connected to the server device 202 via a network 240. Each of these components may be implemented on one or more computing devices. Further details regarding computing devices are provided below in connection with FIG. 6, along with additional details regarding networks, such as the network 240 shown.

In various implementations, the database management system 204 may include features and functionality that enable a user associated with the client device 230 to process queries submitted to the database management system 204 (e.g., a relational database system) according to operators indicated within respective queries. The database management system 204 may also facilitate receiving and processing workloads that include sets of queries.

As shown, the database management system 204 includes the workload reduction system 206, an index-tuning advisor 224, and a data store 226 having tables (or other data sets). As mentioned above, the database management system 204 provides workloads to the index-tuning advisor 224, which performs index tuning based on accessing the tables 228 in the data store 226. However, in various implementations, the workload reduction system 206 intercepts incoming workloads, generates reduced workloads, and provides the simplified reduced workloads to the index-tuning advisor 224 for faster processing and tuning.

As just mentioned, the database management system 204 includes the workload reduction system 206. In some implementations, the workload reduction system 206 is located on a separate computing device from the database management system 204 within the server device 202 (or apart from the server device 202). In various implementations, the database management system 204 operates without the workload reduction system 206.

As mentioned earlier, the workload reduction system 206 generates reduced workloads for the database management system 204. As illustrated, the workload reduction system 206 includes various components and elements that are implemented in hardware and/or software. For example, the workload reduction system 206 includes a workload manager 212, a table reduction manager 214, a query re-write manager 216, and a storage manager 218. The storage manager 218 includes workloads 220 and reduced workloads 222.

As mentioned above, the workload reduction system 206 includes the workload manager 212, which receives and receives and manages workloads 220. For example, the workload manager 212 intercepts workloads 220 intended for the index-tuning advisor 224 and, upon being generated, provides reduced workloads 222 in place of the workloads 220 to the index-tuning advisor 224.

The workload reduction system 206 includes the table reduction manager 214 (or a table selection manager), which selects a subset of tables from the tables 228 of the database management system 204 referred to by the queries in a workload. The table reduction manager 214 may utilize various approaches to determine which of the tables 228 to eliminate from a workload. In some implementations, the table reduction manager 214 is a column selection manager that selects columns to be excluded from a set of queries using similar approaches to those of removing tables. Additional details regarding selecting tables and columns and/or excluding tables and columns are provided below in connection with FIGS. 3A-3B.

The workload reduction system 206 also includes the query re-write manager 216, which re-writes queries in a workload to simplify the queries. In various implementations, the query re-write manager 216 simplifies queries by re-writing queries in the workload to remove references to excluded tables or to otherwise modify query operations by following a set of node reduction rules. Additional details regarding re-writing queries into less complex versions are provided below in connection with FIGS. 4A-4B.

As shown, the computing environment 200 includes the client device 230. In various implementations, the client device 230 is associated with a user (e.g., a user client device), such as a user who provides a workload to the database management system 204. In various instances, the client device 230 includes a client application 232, such as a web browser, mobile application, or another form of computer application for accessing and/or interacting with the database management system 204 and/or the workload reduction system 206.

Figure 3A:
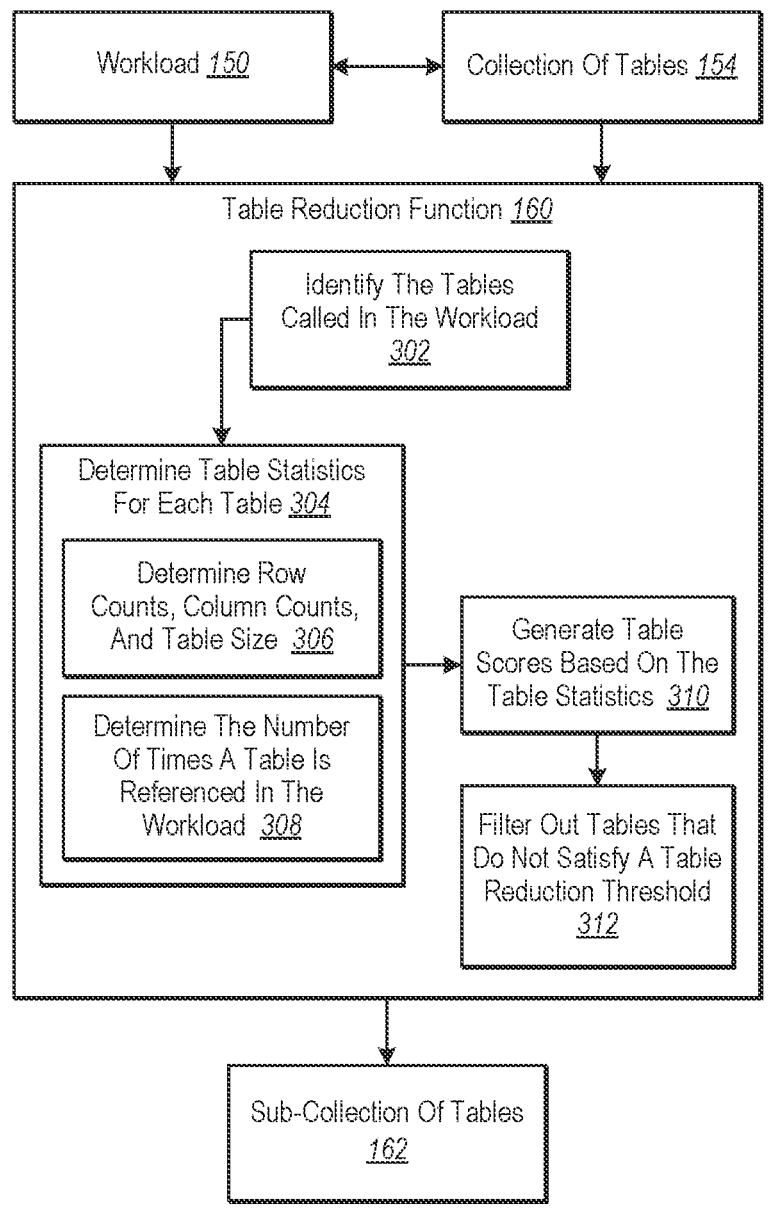
FIGS. 3A-3B illustrate example diagrams for using a table reduction function to identify tables to remove from a workload.
Figure 3B:
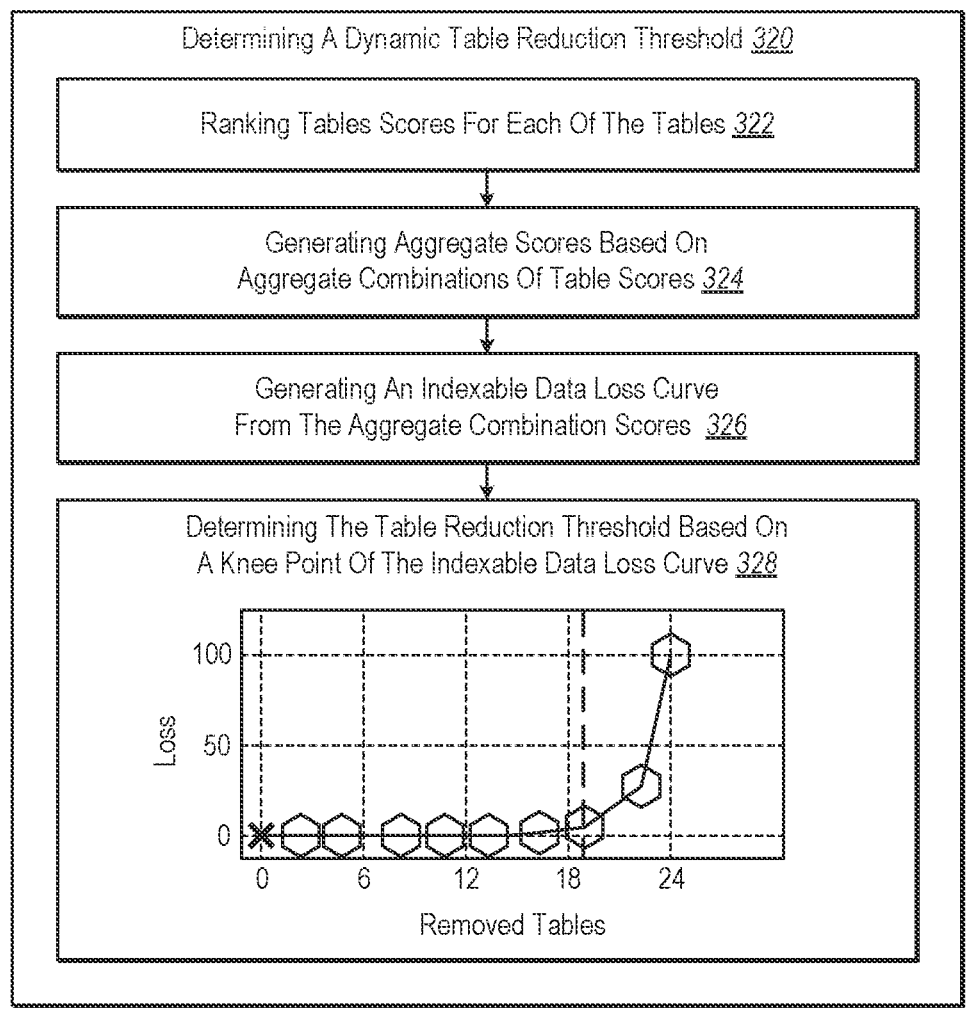

Turning to the next figures, FIGS. 3A-3B illustrate example diagrams for using a table reduction function to identify tables to remove from a workload. In particular, FIG. 3A illustrates the workload reduction system using a table reduction function while FIG. 3B illustrates determining a table reduction threshold.

FIG. 3A includes the table reduction function 160 introduced above. As shown, the workload reduction system 206 provides a workload 150 and a collection of tables 154 associated with the workload 150 to the table reduction function 160, which determines a sub-collection of tables 162. The sub-collection of tables 162 includes fewer tables than the collection of tables 154. In other words, the table reduction function 160 removes or excludes one or more tables from the collection of tables 154 to generate or determine the sub-collection of tables 162.

FIG. 3A illustrates one example approach that the workload reduction system 206 uses for generating the sub-collection of tables 162. To start, the workload reduction system 206 uses the table reduction function 160 to perform act 302 of identifying the tables called in the workload 150. For instance, the table reduction function 160 identifies all of the tables referenced by queries in the workload 150 (i.e., the collection of tables 154). In some instances, this includes tables that an index-tuning advisor would need to access to process the queries in the workload 150.

As an example, the workload reduction system 206 identifies multiple queries within the workload 150. Based on analyzing the multiple queries, the workload reduction system 206 identifies five tables (e.g., T1, T2, T3, T4, and T5). This example will be continued below.

Act 304 includes the workload reduction system 206 using the table reduction function 160 to determine table statistics for each table. For example, the workload reduction system determines a range of features, attributes, characteristics, metadata, and/or statistics for each of the identified tables in the collection of tables 154. As shown, the workload reduction system 206 may determine 306 row counts, column counts, and table size. The workload reduction system 206 may also determine 308 the number of times a table is referenced in the workload 150 (referred to as "number of references" or "NumRef").

In some implementations, the workload reduction system 206 determines low-overhead statistics. For example, the workload reduction system 206 determines the table size (e.g., rows times columns) and the number of references for each table. To illustrate, in the above example, the workload reduction system 206 determines the statistics shown in Table 1 below.

TABLE 1

Low-Overhead Statistics

|  | Table 1 | Table 2 | Table 3 | Table 4 | Table 5 |
|---|---|---|---|---|---|
| Table Size: | 20 | 40 | 12 | 15 | 30 |
| Number of References: | 5 | 1 | 10 | 5 | 3 |

Act 310 includes the workload reduction system 206 using the table reduction function 160 to generate table scores based on the table statistics. The workload reduction system 206 may utilize one or more approaches, functions, algorithms, or formulas to generate scores for each of the tables in the collection of tables 154 based on the determined statistics. Then, using the table scores, the workload reduction system 206 can rank or order the tables.

In various implementations, the workload reduction system 206 determines a table score by combining low-overhead table statistics. For example, the workload reduction system 206 generates a table score by combining or multiplying the table size (e.g., rows×columns) by the number of references (e.g., the number of times the table is called in the workload). Table 2 below shows the table scores for the provided example.

TABLE 2

Table Scores

|  | Table 1 | Table 2 | Table 3 | Table 4 | Table 5 |
|---|---|---|---|---|---|
| Table Score: | 100 | 40 | 120 | 75 | 90 |

In some implementations, when targeting the removal of columns through a column selection process, the workload reduction system 206 may use another scoring algorithm that determines a column score. For example, the workload reduction system 206 determines a column score based on the number of rows in the column combined with the number of column references in the workload.

Act 312 includes the workload reduction system 206 using the table reduction function 160 to filter out tables that do not satisfy a table reduction threshold. In various implementations, the workload reduction system 206 determines to drop one or more tables based on their table scores. This way, the workload reduction system 206 reduces the number of tables that need to be called in the reduced workload by eliminating the least valuable tables.

In some instances, the workload reduction system 206 uses a table reduction threshold to determine whether to drop a given table. For example, tables with a score that satisfies (e.g., meets or exceeds) a table reduction threshold are included in a sub-collection of tables 162, as shown. Otherwise, tables with scores that do not satisfy the table reduction threshold are removed from the collection of tables 154 and/or excluded from the sub-collection of tables 162.

In some implementations, the table reduction threshold is a predetermined value or amount. For instance, the table reduction threshold is a reduced amount (e.g., percentage, number, or percentile) of the total number of tables in the collection of tables 154. For example, if the table reduction threshold is 75%, the workload reduction system 206 removes the lowest 25% of tables. If the table reduction threshold is 4 tables, the workload reduction system 206 keeps the top 4 tables. If the table reduction threshold is the 80th percentile, the workload reduction system 206 arranges the tables across a statistical distribution and removes tables that fall outside of the 80th percentile range.

In one or more implementations, the workload reduction system 206 utilizes a dynamic table reduction threshold that is determined to minimize efficiency losses due to removed tables. To illustrate, FIG. 4B shows a process 320 for determining a dynamic table reduction threshold. As shown, the process 320 in FIG. 4B includes a series of acts for determining a dynamic table reduction threshold. In many implementations, the process 320 of determining the dynamic table reduction threshold is hidden from a user.

Act 322 in FIG. 4B includes the workload reduction system 206 ranking table scores for each of the tables. In the above example, as shown in Table 2, Tables 1-5 have the following scores: T1=100, T2=40, T3=120, T4=75, T5=90. Recorded by ranking, the list of tables is:
1. Table 3 (120)
2. Table 1 (100)
3. Table 5 (90)
4. Table 4 (75)
5. Table 2 (40)

Act 324 includes the workload reduction system 206 generating aggregate scores based on aggregate combinations of the table scores. For example, the workload reduction system 206 uses the table rankings to determine aggregate combination scores (e.g., aggregate table scores) that indicate the indexable data value of keeping the top-n tables. To illustrate, the value of keeping one table is 120, two tables is 220 (e.g., 120+100), three tables is 310 (e.g., 120+100+90), four tables is 385 (e.g., 120+100+90+75), and five tables is 425 (e.g., 120+100+90+75+40).

In this document, the indexable data value of a table refers to the value of a table based on how frequently the table is called in a workload. Indexable data can refer to a table or a column. For example, for a column, indexable data is defined as $D(c):=|c| \cdot f(c,W)$, where D is indexable data, W is the workload, c is a column ($c \in \pi(W)$), $|c|$ is the column size (e.g., the number of rows in the table where c belongs), and f(c,W) is the frequency in W (e.g., the number of times c is referenced in W). In some instances, f(c,W) refers to the number of times c's table is referenced in W.

Act 326 includes generating an indexable data loss curve from the aggregate combination scores. In some implementations, act 326 includes plotting the aggregate combination scores in a line or curve on a graph. In some implementations, act 326 includes performing a data loss function based on the table scores. To illustrate, in one or more implementations, the workload reduction system 206 determines the indexable data loss based on: $D \, Loss(x) := \Sigma_{t \in T_{D[:x]}} D(t) / \Sigma_{t \in T_D} D(t) * 100\%$, where T is the number of tables referenced in W; $T_D := [t_1, \ldots, t_T]$ is a ranking of the T tables based on D, and where $T_D[:x]$ are the top-x tables in $T_D$.

Act 328 includes the workload reduction system 206 determining the table reduction threshold based on a knee point of the indexable data loss curve. In various implementations, the workload reduction system 206 applies a knee-point detection algorithm to determine the knee point within the indexable data loss curve. The knee point corresponds to the number of tables to keep in the workload. If the knee point falls between two integers, the closest, higher, or lower integer may be selected.

The knee point provides an optimal table reduction threshold without needing to determine the more complex and computationally expensive improvement loss curve. In various implementations, the knee-point algorithm identifies a data point that has the maximum perpendicular distance to a straight line drawn from the first to the last point of normalized data.

In the example illustration shown in act 328 of FIG. 3B, the workload reduction system 206 determines a knee point of 19 out of 24 total tables. The knee point is shown as the dashed line. In this example, the workload reduction system 206 removes 5 tables from the workload.

As mentioned above in connection with FIG. 3A, the workload reduction system 206 uses the table reduction threshold to determine how many and which tables to include in the sub-collection of tables 162 by removing or eliminating tables from the collection of tables 154.

Algorithm 2, provided below, provides an example of performing table reduction. While Algorithm 2 relates to tables, in some implementations, the references to tables may be replaced with references to columns and column reduction/selection.

Figure 4A:
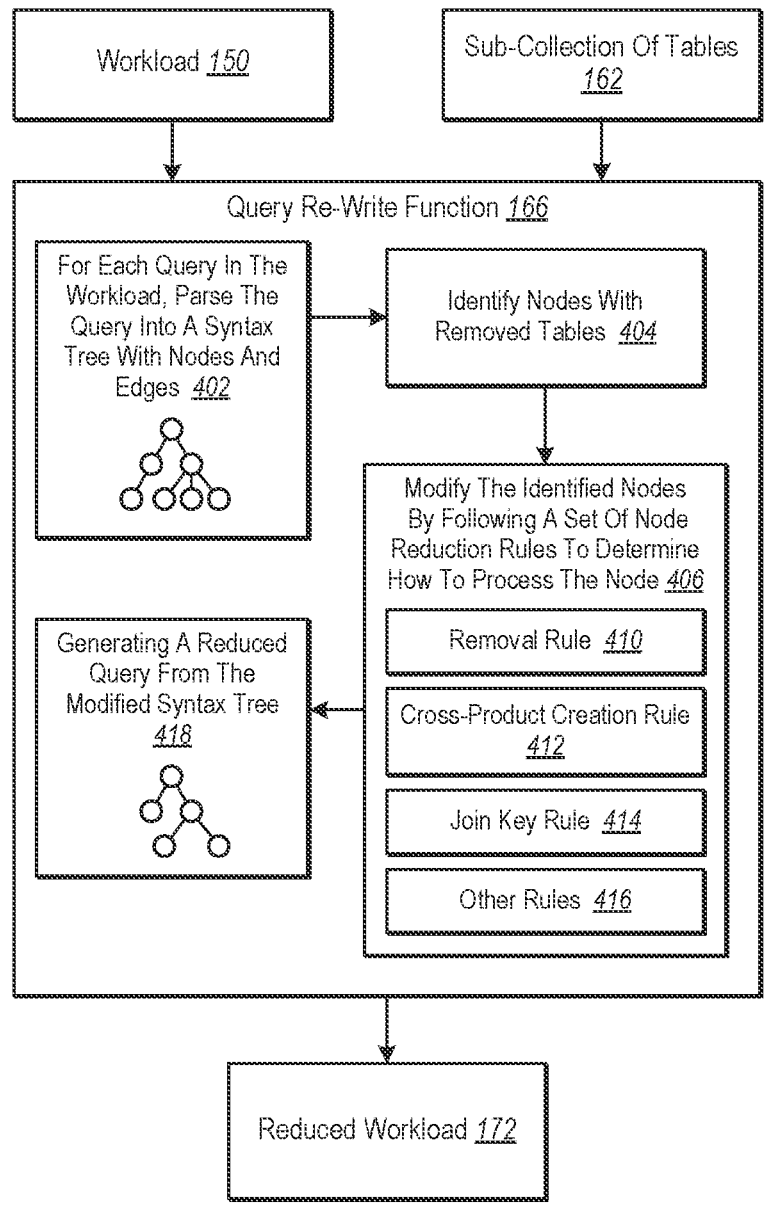

---
Algorithm 2 - TABLEREDUCTION
---
Input: Input workload W, max number of tables $l \in [0..L]$
Output: Subsets of tables $K \subseteq \pi(W)$ s.t. $|K| \leq u$
1:    $K \leftarrow \emptyset$
2:    $T \leftarrow$ GETTABLES(W)      (Array of tables referenced in W)
3:    $D \leftarrow$ ARRAY(count: $|T|$)    (Array of indexable data scores)
4:    for all $i \in [1..|T|]$ do
5:      $D_i \leftarrow T_i$.TABLESIZE $\times T_i$.NUMREFS(W)
6:    $I \leftarrow$ ARGSORT(D)      (Indexes of sorted D (desc. order))
7:    for all $i \in [1..|I|]$ do
8:      $t \leftarrow T_{I_i}$                  ($i^{th}$ best table)
9:      if $|K| + |t| \leq 1$ then
10:       $K \leftarrow K \cup t$
11:      else break
12:   return K FIGS. 4A-4B illustrate example diagrams for using a query re-write function to re-write queries in the workload based on removed tables. In particular, FIG. 4A illustrates the workload reduction system using a query re-write function. FIG. 4B illustrates examples of re-written queries from a workload.

FIG. 4A includes the query re-write function 166 introduced above. As shown, the workload reduction system 206 provides the workload 150 and the sub-collection of tables 162 to the query re-write function 166, which generates a reduced workload 172. The reduced workload 172 includes re-written queries that are less complex than the original queries from the workload 150.

FIG. 4A illustrates one example approach that the workload reduction system 206 uses to generate the reduced workload 172. To start, the workload reduction system 206 uses the query re-write function 166 to perform act 402 of parsing, for each query in the workload, the query into a syntax tree with nodes and edges. In various implementations, a syntax tree (also called a parse tree or a derivation tree) is a tree-like representation of the syntactic structure of a query. In some implementations, the nodes in the syntax tree correspond to a construct occurring in the query. In various instances, a syntax tree is an abstract syntax tree (AST). In these implementations, the syntax tree is abstract in the sense that it represents the structural or content-related details of a query rather than the exact syntax. For instance, grouping parentheses in the query are represented as separate nodes.

In various implementations, act 402 includes parsing the query. In some instances, before parsing, the workload reduction system 206 tokenizes the query into a list of tokens representing keywords, identifiers, operators, and literals. The workload reduction system 206 then provides the list of tokens to a parser that builds a syntax tree, where each node represents a construct in the query. As mentioned, in various implementations, the parser builds an abstract syntax tree. For instance, in some instances, the abstract syntax tree is a simplified version of a syntax tree that only includes structural or content-related details.

As a non-limiting example, suppose the query was the following SQL query:
SELECT name FROM students WHERE grade>90.

For this query, the workload reduction system 206 generates tokens of SELECT, name, FROM, students, WHERE, grade, >, and 90. Additionally, the parser recognizes these tokens and constructs a syntax tree. In some instances, the syntax tree is then simplified into an abstract syntax tree that represents the structure of the query.

Act 404 includes the workload reduction system 206 using the query re-write function 166 to identify nodes with removed tables. For example, the workload reduction system 206 uses the sub-collection of tables 162 to identify which tables are not included in the workload 150. In some implementations, the workload reduction system 206 uses another sub-collection of tables that only includes the tables that the table reduction function 160 determined to remove from the workload 150. In various implementations, the workload reduction system 206 traverses the syntax tree, identifies when a node references a table, and determines if the table is included or excluded from the sub-collection of tables.

Act 406 includes the workload reduction system 206 using the query re-write function 166 to modify the identified nodes by following a set of node reduction rules to determine how to process the node. The workload reduction system 206 determines whether to keep, remove, or modify each identified node based on the set of node reduction rules.

In many implementations, the workload reduction system 206 removes an identified node that references a removed or excluded table. For example, the workload reduction system 206 follows a removal rule 410 from the set of node reduction rules.

In some implementations, removing a node can create errors and may cause an index-tuning advisor to perform additional steps to correct the errors. To elaborate, in various instances, if the workload reduction system 206 blindly removes all columns and/or tables according to the sub-collection of tables 162, it may introduce new cross-products in the resulting query or prevent certain tables/columns from being considered for candidate indexes. This could potentially worsen the results produced by an advisor. Accordingly, in various implementations, the workload reduction system 206 verifies whether removing a node satisfies other rules from the set of node reduction rules. As shown, act 406 includes additional node reduction rules including a cross-product rule 412, a join key rule 414, and other rules 416.

The cross-product rule 412 verifies whether removing a node results in the creation of cross-products in a query, which may impact the quality of index tuning by significantly increasing the query cost. To elaborate, because index-tuning advisors typically use query costs to guide their search, adding a cross-product may inadvertently cause an advisor to focus on tuning this particular query and ignore many others. Therefore, in various instances, for the reduction workload to effectively reduce index-tuning complexity and search times, the workload reduction system 206 should re-write the queries to have lower costs than the original queries.

In various implementations, two nodes (or syntax table expressions) form a cross-product if there is no path between them in the join graph. Conversely, if two nodes are directly or indirectly connected, no cross-product exists. For example, Node A connects to Node B, which connects to Node C (i.e., A-B-C). If Node B is removed, Node A and Node B form a cross-product. If Node D is connected to Node C, this creates two sub-graphs, which increases search complexity. To address these issues, the workload reduction system 206 would need to add additional connections to the syntax tree to reconnect the separated nodes, creating one or more cross-products.

In one or more implementations, the cross-product rule 412 guides the workload reduction system 206 to detect whether a node removal will introduce new cross-products by checking whether the number of connected components in the graph increases after eliminating the nodes and their corresponding edges. For example, the cross-product rule 412 prevents the removal of a node that would create a cross-product.

The join key rule 414 verifies that unwanted losses of join keys will not result when a node is removed. The loss of join keys may prevent an index-tuning advisor from considering the join keys for candidate indexes. To elaborate, suppose that the original query has a join predicate C1=C2 and C1 is to be eliminated. Here, to maintain valid query syntax (e.g., SQL syntax), the workload reduction system 206 would need to eliminate the whole predicate, which includes removing C2 (which was not selected for removal and is needed in the re-written queries). In some instances, removing C2 would cause a significant quality loss. Accordingly, the join key rule 414 provides rules and guidelines to prevent removing nodes that would cause join key loss.

The other rules 416 provide additional rules and guidelines for modifying nodes. In one or more implementations, the workload reduction system 206 may move table references around in the re-written query to satisfy one or more rules. In some instances, the workload reduction system 206 adds new nodes to the syntax tree to allow for other nodes to be removed (e.g., to satisfy all of the rules).

Act 418 includes the workload reduction system 206 using the query re-write function 166 to generate a reduced query from the modified syntax tree. In various implementations, the workload reduction system 206 utilizes a re-write query function to traverse the modified syntax tree and syntactically re-write the query. For example, the workload reduction system 206 employs a print library function to re-write the query as a reduced query from the modified syntax tree (e.g., the modified abstract syntax tree).

In various implementations, the re-written query does not need to produce the same results as the original query, as long as it allows an index-tuning advisor (or another database administrator tool) to successfully and efficiently perform index tuning. Indeed, the re-written query reflects the modifications made to the syntax tree, which may change the structure, call, components, elements, and functions of the query. The workload reduction system 206 aims to re-write queries that include fewer arguments while still maintaining accurate functions. This way, the workload reduction system 206 generates a reduced workload 172 that reduces query execution time by an index-tuning advisor or another database administrator tool.

As shown in FIG. 4A, the workload reduction system 206 generates the reduced workload 172, which includes one or more re-written, reduced queries from the more complex queries in the original workload. The workload reduction system 206 may provide the reduced workload 172 to an index-tuning advisor or another database administrator tool, as described above.

FIG. 4B illustrates examples of re-written queries. In particular, FIG. 4B shows a workload 420 with two queries ($Q_1$ and $Q_2$) and a reduced workload 430 with the two queries re-written ($Q'_1$ and $Q'_2$). As shown, the re-written queries in the reduced workload 430 are less complex in terms of the number of steps and resources needed to perform the queries. In particular, the re-written queries remove some functions, modify some functions, and add a new function to generate reduced queries.

As noted above, while this disclosure corresponds to removing tables from a workload to reduce workload complexity, the workload reduction system 206 may use similar approaches and techniques to remove one or more columns referenced from the workload. For example, the workload reduction system 206 may remove calls to less valuable columns of a table included in the workload.

Figure 5:
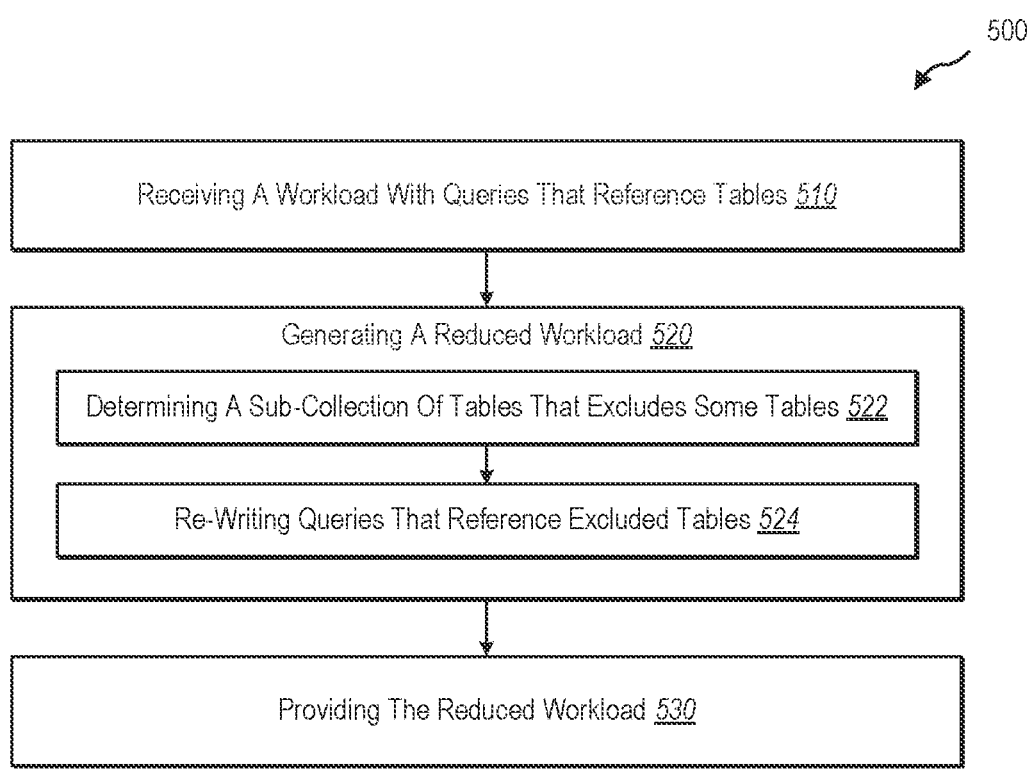
FIG. 5 illustrates an example series of acts in a computer-implemented method for reducing workload index tuning complexity in a database system.

Turning now to FIG. 5, this figure illustrates an example series of acts in a computer-implemented method for reducing the complexity of workload index tuning in a database system according to some implementations. While FIG. 5 illustrates acts according to one or more implementations, alternative implementations may omit, add, reorder, and/or modify any of the acts shown. In particular, FIG. 5 includes a series of acts 500 for reducing workload index tuning complexity in a database system.

The acts in FIG. 5 can be performed as part of a method (e.g., a computer-implemented method). Alternatively, a computer-readable medium can include instructions that, when executed by a processing system with a processor, cause a computing device to perform the acts in FIG. 5. In some implementations, a system (e.g., a processing system comprising a processor) can perform the acts in FIG. 5. For example, the system includes a processing system and a computer memory including instructions that, when executed by the processing system, cause the system to perform various actions or steps.

As shown, the series of acts 500 includes act 510 of receiving a workload with queries that reference tables. For instance, in example implementations, act 510 involves receiving a workload comprising a set of queries referencing a collection of tables including a first table and additional tables. In various implementations, the collection of tables includes tables within a data store accessible by the database system.

As further shown, the series of acts 500 includes sub-act 520 of generating a reduced workload. Sub-act 520 may include sub-acts, including sub-act 522 of determining a sub-collection of tables that excludes some tables. For instance, in example implementations, sub-act 522 involves determining a sub-collection of tables that excludes the first table based on scoring each table in the collection of tables.

In various implementations, sub-act 522 includes determining a sub-collection of tables that excludes the first table and includes additional tables. In one or more implementations, sub-act 522 includes determining low-overhead table statistics for the first table. In some instances, the low-overhead table statistics for the first table include the table size of the first table and the number of times the first table is called within the workload.

In some implementations, sub-act 522 includes determining a score for the first table by combining the low-overhead table statistics for the first table. In some instances, determining that the sub-collection of tables excludes the first table is based on a score for the first table not satisfying a table reduction threshold. In some instances, the sub-collection of tables excludes any table from the collection of tables having a score that does not satisfy a table reduction threshold.

In various implementations, sub-act 522 includes determining the table reduction threshold based on ranking table scores for each of the tables in the collection of tables, generating aggregate scores based on aggregate combinations of the table scores, generating an indexable data loss curve from the aggregate combination scores, and determining the table reduction threshold based on a knee point of the indexable data loss curve. In some implementations, sub-act 522 also includes determining the table reduction threshold based on an indexable data loss function, where indexable data of a table indicates how often data in the table is accessed to answer the set of queries in the workload.

As further shown, sub-act 520 may include sub-act 524 of re-writing queries that reference excluded tables. For instance, in example implementations, sub-act 522 involves re-writing, based on the sub-collection of tables, a first query in the set of queries to generate a re-written first query that removes a reference to the first table.

In various implementations, sub-act 524 includes re-writing, based on the sub-collection of tables, a first query in the set of queries to generate a re-written first query that removes a reference to the first table. In one or more implementations, sub-act 524 includes generating a modified first query to be included in the reduced workload, wherein executing the modified first query in the reduced workload produces a different output than executing the first query in the workload. In some instances, sub-act 524 includes parsing the first query into a syntax tree with nodes and identifying a first node that references the first table based on the first table being excluded from the sub-collection of tables. In some instances, re-writing the first query includes adding a new node into a reduced syntax tree, which is converted to a modified first query to be included in the reduced workload.

In various implementations, re-writing the first query includes determining that removing the first node satisfies a set of node reduction rules, generating a reduced syntax tree for the first query by removing the first node from the syntax tree, and converting the reduced syntax tree for the first query into a modified first query to be included in the reduced workload. In some instances, re-writing the first query includes determining that removing the first node does not satisfy a cross-product creation rule from a set of node reduction rules and generating a reduced syntax tree for the first query that includes the first node.

In some instances, re-writing the first query includes identifying a second node that references a second table not included in the sub-collection of tables that is included in the collection of tables, determining that removing the second node does not satisfy a join key rule from a set of node reduction rules, generating a reduced syntax tree for the first query that removes the second node from the syntax tree, adding the second table to another location in the reduced syntax tree, and/or converting the reduced syntax tree for the first query into a modified first query to be included in the reduced workload.

As further shown, the series of acts 500 includes act 530 of providing the reduced workload. For instance, in some implementations, act 530 involves providing the reduced workload with the re-written first query to an index-tuning advisor of the database system. In various implementations, act 530 includes providing a reduced workload with the rewritten first query. In one or more implementations, providing the reduced workload to the index-tuning advisor includes not providing the workload to the index-tuning advisor. In some instances, providing the reduced workload includes providing the reduced workload to an index-tuning advisor or a database administrator engine.

Figure 6:
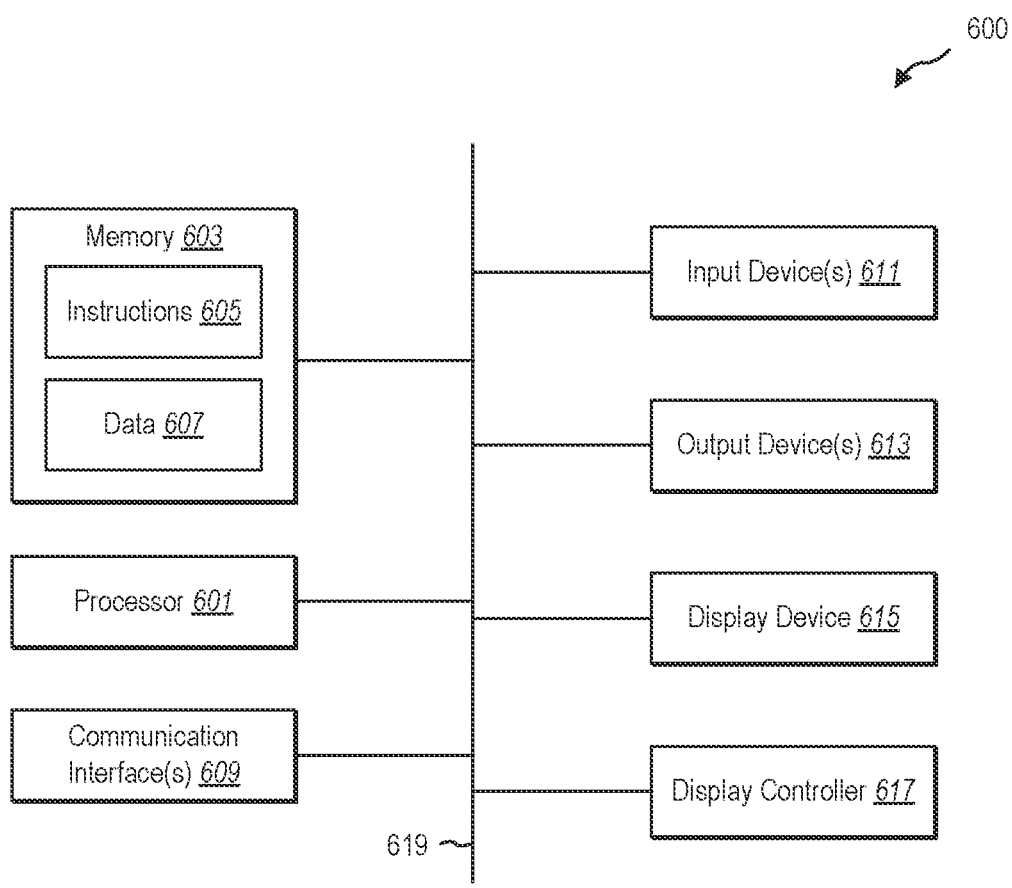
FIG. 6 illustrates example components included within a computer system used to implement the workload reduction system.

FIG. 6 illustrates certain components that may be included within a computer system 600. The computer system 600 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 600 represents one or more of the client devices, server devices, or other computing devices described above. For example, the computer system 600 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 600 includes a processing system including a processor 601. The processor 601 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 601 may be referred to as a central processing unit (CPU) and may cause computer-implemented instructions to be performed. Although the processor 601 shown is just a single processor in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 605 and the data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during the execution of the instructions 605 by the processor 601.

A computer system 600 may also include one or more communication interface(s) 609 for communicating with other electronic devices. The one or more communication interface(s) 609 may be based on wired communication technology, wireless communication technology, or both. Some examples of the one or more communication interface(s) 609 include a Universal Serial Bus (USB), an Ethernet adapter, a wireless adapter that operates according to an Institute of Electrical and Electronics Engineers (IEEE) 602.11 wireless communication protocol, a Bluetooth® wireless communication adapter, and an infrared (IR) communication port.

A computer system 600 may also include one or more input device(s) 611 and one or more output device(s) 613. Some examples of the one or more input device(s) 611 include a keyboard, mouse, microphone, remote control device, button, joystick, trackball, touchpad, and light pen. Some examples of the one or more output device(s) 613 include a speaker and a printer. A specific type of output device that is typically included in a computer system 600 is a display device 615. The display device 615 used with implementations disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For clarity, the various buses are illustrated in FIG. 6 as a bus system 619.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Furthermore, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for reducing workload index tuning complexity in a database system, comprising:
   receiving a workload comprising a set of queries referencing a collection of tables including a first table and additional tables;
   generating a reduced workload by:
      determining a sub-collection of tables that excludes the first table based on scoring each table in the collection of tables; and
      re-writing, based on the sub-collection of tables, a first query in the set of queries to generate a re-written first query that removes a reference to the first table while maintaining references to the additional tables; and
   providing the reduced workload with the re-written first query to an index-tuning advisor of the database system to generate an output based on the reduced workload using fewer query operations that access fewer tables than based on the workload having the set of queries.

2. The computer-implemented method of claim 1, further comprising determining low-overhead table statistics for the first table.

3. The computer-implemented method of claim 2, wherein the low-overhead table statistics for the first table include a table size of the first table and a number of times the first table is called within the workload.

4. The computer-implemented method of claim 2, further comprising determining a first table score for the first table by multiplying a table size of the first table by a number of times the first table is called within the workload.

5. The computer-implemented method of claim 1, wherein the determining that the sub-collection of tables excludes the first table is based on a first table score for the first table not satisfying a table reduction threshold.

6. The computer-implemented method of claim 5, further comprising determining the table reduction threshold based on:
ranking table scores for each of the tables in the collection of tables;
generating aggregate scores based on aggregate combinations of the table scores;
generating an indexable data loss curve from the aggregate combinations of the table scores; and
determining the table reduction threshold based on a knee point of the indexable data loss curve.

7. The computer-implemented method of claim 6, wherein the determining the table reduction threshold is based on an indexable data loss function, where indexable data of a table indicates how often data in the table is accessed to answer the set of queries in the workload.

8. The computer-implemented method of claim 1, wherein the sub-collection of tables excludes any table from the collection of tables having a score that does not satisfy a table reduction threshold.

9. The computer-implemented method of claim 1, wherein the re-writing the first query includes generating a modified first query to be included in the reduced workload, wherein executing the modified first query in the reduced workload produces a different output than executing the first query in the workload.

10. The computer-implemented method of claim 1, wherein the re-writing the first query includes:
parsing the first query into a syntax tree with nodes; and
identifying a first node that references the first table based on the first table being excluded from the sub-collection of tables.

11. The computer-implemented method of claim 10, wherein the re-writing the first query includes:
determining that removing the first node satisfies a set of node reduction rules;
generating a reduced syntax tree for the first query by removing the first node from the syntax tree; and
converting the reduced syntax tree for the first query to a modified first query to be included in the reduced workload.

12. The computer-implemented method of claim 10, wherein the re-writing the first query includes:
determining that removing the first node does not satisfy a cross-product creation rule from a set of node reduction rules; and
generating a reduced syntax tree for the first query that includes the first node.

13. The computer-implemented method of claim 10, wherein the re-writing the first query includes:
identifying a second node that references a second table not included in the sub-collection of tables that is included in the collection of tables;
determining that removing the second node does not satisfy a join key rule from a set of node reduction rules;
generating a reduced syntax tree for the first query that removes the second node from the syntax tree;
adding the second table to another location of the reduced syntax tree; and
converting the reduced syntax tree for the first query to a modified first query to be included in the reduced workload.

14. The computer-implemented method of claim 1, wherein:

the re-writing the first query includes adding a new node to a reduced syntax tree; and
the reduced syntax tree is converted to a modified first query to be included in the reduced workload.

15. The computer-implemented method of claim 1, wherein the providing the reduced workload to the index-tuning advisor includes not providing the workload to the index-tuning advisor.

16. A computer-implemented method for generating one or more reduced workloads that reduce index tuning complexity in a database system, comprising:
receiving a workload comprising a set of queries referencing a collection of tables including a first table and additional tables;
generating a reduced workload by:
determining a sub-collection of tables that excludes the first table and includes the additional tables based on the first table having a lower table score than additional table scores of the additional tables; and
re-writing, based on the sub-collection of tables, a first query in the set of queries to generate a re-written first query that removes a reference to the first table while maintaining references to the additional tables; and
providing the reduced workload with the re-written first query to an index-tuning advisor of the database system to generate an output based on the reduced workload using fewer query operations that access fewer tables than based on the workload having the set of queries.

17. The computer-implemented method of claim 16, wherein the providing the reduced workload includes providing the reduced workload to the index-tuning advisor or a database administrator engine.

18. The computer-implemented method of claim 16, wherein the determining that the sub-collection of tables excludes the first table is based on a score for the first table not satisfying a table reduction threshold.

19. A system comprising:
a database system having a collection of tables including a first table and additional tables in a data store; and
a computer memory with instructions that, when executed by a processor, cause the system to perform operations of:
receiving a workload comprising a set of queries referencing the collection of tables;
generating a reduced workload by:
determining a sub-collection of tables that excludes the first table based on comparing table scores generated for each table in the collection of tables; and
re-writing, based on the sub-collection of tables, a first query in the set of queries to remove calls to one or more nodes that reference the first table while maintaining references to the additional tables; and
providing the reduced workload with one or more re-written queries to an index-tuning advisor of the database system to generate an output based on the reduced workload using fewer query operations that access fewer tables than based on the workload having the set of queries.

20. The system of claim 19, wherein the collection of tables includes tables within the data store accessible by the database system.

* * * * *